Nov. 13, 1928.
C. J. DRESSER
1,691,433
PHASE FAILURE AND PHASE REVERSAL PROTECTOR
Filed June 9, 1926
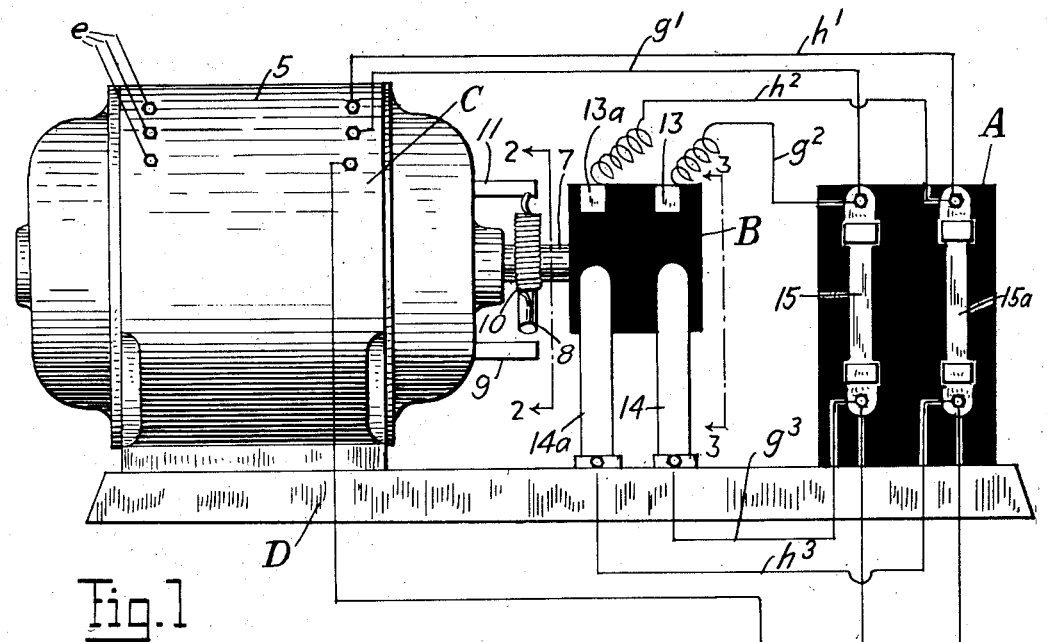
Fig.1
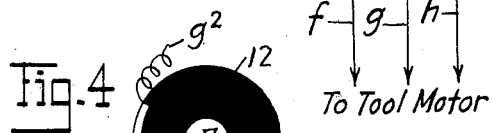
To Tool Motor
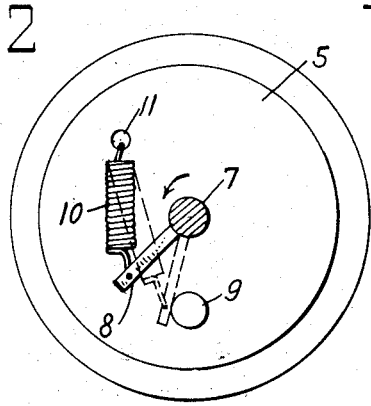
Fig.2   Fig.4   Fig.3
INVENTOR.
Clarence J. Dresser
BY
Ira L. Nickerson
ATTORNEY.

Patented Nov. 13, 1928.

1,691,433

UNITED STATES PATENT OFFICE.

CLARENCE J. DRESSER, OF CLEVELAND, OHIO, ASSIGNOR TO CHICAGO PNEUMATIC TOOL COMPANY, OF NEW YORK, N. Y., A CORPORATION OF NEW JERSEY.

PHASE-FAILURE AND PHASE-REVERSAL PROTECTOR.

Application filed June 9, 1926. Serial No. 114,628.

This invention relates to electrical systems utilizing polyphase alternating current for the operation of induction motors, and more particularly to protective devices for preventing the disastrous effects which result from the condition known as "single phasing".

The recent adoption of high frequency polyphase current for operating portable electrical tools has brought the above noted condition into considerable prominence. The mere fact that the motor is used in a portable outfit with a flexible cable connection increases the occurrence of the condition from cable trouble. In addition the handling and operation of such tools by men unskilled in electrical matters sometimes results in improper connections. Such men often do not recognize the condition when it occurs and attempt to operate or to continue to operate the motor.

Among the objects of the invention are to protect motors of the type described from damage in the event of phase-failure or phase-reversal conditions, to break the electric connection so as to prevent starting of the motor or to stop the motor in the event that such a condition develops, and to provide simple, compact, inexpensive and positive operating means for accomplishing the above objects. Other objects will be apparent from the detailed description which follows:

While there are several possible applications of the principle of the invention, the embodiment thereof shown in the accompanying drawing is a preferred form since it is relatively simple and practical from a commercial standpoint. In the drawing:

Fig. 1 is a side elevational view.

Fig. 2 is a detailed vertical sectional view on the line 2—2 of Fig. 1.

Fig. 3 is an end elevational view of the short circuiting switch as indicated by line 3—3 of Fig. 1.

Fig. 4 is an elevational view similar to Fig. 3 showing the parts in a different position.

The invention comprises suitable means for interrupting or opening the circuit to the motor or tool to be protected in the event of phase failure, or a phase reversal, and for maintaining the circuit interrupted until the trouble is remedied. It may consist of one or more sensitive circuit breaking devices which operate automatically and of means for preventing the operation of the circuit breaking devices so long as the power characteristics of the circuit remain normal. One method of accomplishing this is by the use of short circuiting or shunting devices controlled by electro-magnetic means operating as a function of the condition of the circuit itself.

In the drawing the circuit breaking means is indicated in general at A, the short circuit or shunting means at B and the control means for the short circuiting apparatus at C. The control apparatus preferably takes the form of a small induction motor 5 having two or three phases, according to the current supply entering the same through leads $e$. Its windings are in series with the winding of the motor or tool to be protected and are of low impedance. The rotor can be either wire wound or of the bar type and the whole is designed to give sufficient torque to actuate the short circuiting or shunting device B, which, as is evident from Fig. 1, is mounted upon the movable armature shaft 7. Shaft 7 has a fixed arm 8 projecting therefrom which is arranged to limit the rotation of the shaft by coming in contact with a post or stop 9 projecting from the motor casing. A coil spring 10 secured to arm 8 at one end and to a post 11 on the motor casing at the other is arranged yieldingly to maintain shaft arm 8 in spaced relation with stop 9 as clearly indicated in Fig. 2.

The form of short circuiting or shunting switch disclosed comprises a cylinder 12 of insulating material fixedly secured upon shaft 7 and having imbedded therein a desired number of contact plates, in the present instance, two, 13 and 13ª, which engage brushes or fixed contact members 14, 14ª which may be secured to the base D upon which elements A, B and C are supported.

While any suitable or desired form of automatic circuit breaking apparatus may be used, that shown is of the ordinary fusible type comprising a desired number of separate fuses, in the present instance, two, 15 and 15ª.

The fuses and control motor 5 are in series with the motor or tool to be protected (not shown). Thus leads $f$, $g$ and $h$ extending to the tool motor connect respectively with a terminal of control motor 5, fuse 15 and fuse 15ª. The opposite end of fuse 15 connects with another terminal of control motor 5 by a lead $g'$, and the other end of fuse 15ª with the third terminal of control motor 5 by a lead $h'$. Leads $g^2$ and $g^3$ connecting with opposite ends of fuse 15 extend respectively to fixed brush 14 and contact plate 13, respectively. Similar leads $h^2$ and $h^3$ extending from opposite ends of fuse $15^a$ connect with fixed brush $14^a$ and with contact plate $13^a$, respectively. Leads $g^2$ and $h^2$ have coiled portions to allow for the movement of the portion of the short circuiting switch B to which they are connected.

The operation of the apparatus is as follows: When the circuit is closed either by throwing the line switch or by closing the switch on the portable tool, or other electrical device, current immediately flows through the windings of control motor 5 and through fuses 15 and $15^a$ to the tool. At the same instant a torque is applied to motor shaft 7 by motor 5 in the direction of the arrow (Fig. 2) turning the shaft until arm 8 engages stop 9, the position of the parts being then indicated in dotted outline in Fig. 2. This partial rotation of the shaft 7 brings contact plates 13 and $13^a$ into engagement with brushes or fixed contacts 14 and $14^a$, respectively (Fig. 4). Control motor 5 is so designed that the torque exerted is sufficient with a minimum current flowing to keep the short circuiting switch B closed against the pull of the spring 10, provided that all three phases are functioning. Should one phase become open the motor immediately loses its torque and spring 10 returns the motor to its normal position opening the short circuit switch B and throwing fuses 15 and $15^a$ entirely into circuit. These fuses are very light having only capacity enough to carry the initial rush of current for an instant until control motor 5 functions to close the short circuiting switch and bridge the fuses. The result is that the fuses burn out making it impossible to operate the tool. By the same token if an attempt is made to start the tool when a phase is open or reversed, the control motor 5 will not function and the fuse will burn out as before.

From the above it will be apparent that the invention provides means for preventing operation of a polyphase motor when a condition of single-phasing or phase-reversal exists, that the apparatus provided for this purpose is positive in operation, simple, compact, cheap to manufacture and assemble, that having no heavy wearing parts or delicate mechanisms it is not likely to fail or get out of order, and that the only replacement parts are inexpensive fuses.

While a preferred form of the invention has been herein shown and described it is to be understood that the invention is not limited to the specific details thereof but covers all changes, modifications and adaptations within the scope of the appended claims.

I claim as my invention:

1. In a polyphase electrical system for operating induction motors, in combination, fuses for interrupting the circuit to the motor, and means immediately shunting said fuses when the power is turned on if the power characteristics are normal.

2. In a polyphase electrical system for operating induction motors, in combination, fuses for interrupting the circuit to the motor, and an automatic switching device operable immediately upon the turning on of the electrical current for shunting said fuses if and so long as the power characteristics are and remain normal.

3. In a polyphase electrical circuit for operating an induction motor, in combination, means in said circuit for opening the same upon the flow of power therethrough for a short period, and means operating before the end of said period for shunting the power around said first named means and for so maintaining the circuit so long as the power characteristics of the circuit remain normal.

4. In a polyphase electrical circuit for operating an induction motor, in combination, means in said circuit for opening the same upon the flow of power therethrough for a short period, and means operating automatically before the end of said period for shunting the power around said first named means including electromagnetic means operating as a function of the power characteristics of the circuit.

5. In a polyphase electrical circuit for operating an induction motor, in combination, means in said circuit for opening the same upon the flow of power therethrough for a short period, movable means for shunting the power around said first named means, and means operating automatically as a function of the power characteristics of the circuit for controlling said movable means.

6. In a polyphase electrical circuit for operating an induction motor, in combination, means in said circuit for opening the same upon the flow of power therethrough for a short period, movable means for short circuiting said first named means, and electromagnetic means connected into said circuit for actuating said movable means to short circuiting position only when the power characteristics of the circuit are normal.

7. A phase failure and phase reversal protector for motors operated by polyphase alternating current comprising sensitive circuit breaking means, an induction motor having its winding in series with the motor to be protected, and means controlled by said induction motor for short circuiting said circuit breaking means only when the power characteristics of the circuit are normal.

8. A phase failure and phase reversal protector for motors operated by polyphase alternating current comprising sensitive circuit breaking means, an induction motor having its windings in series with the motor to be protected, said induction motor having a rotatable shaft, means limiting the rotative movement of said shaft, and a by-pass for said circuit breaking means controlled by said shaft.

9. A phase failure and phase reversal protector for motors operated by polyphase alternating current comprising sensitive fuses for opening the circuit, an induction motor having a rotatable shaft and arranged to apply a relatively light torque thereto, stop means for limiting the rotation of said shaft in one direction, means for restoring said shaft to normal position and for opposing the torque of said motor, and a by-pass for current flowing to said fuses controlled by said shaft.

10. A phase failure and phase reversal protector for motors operated by polyphase alternating current comprising sensitive fuses for opening the circuit, an induction motor having a rotatable shaft and arranged to apply a relatively light torque thereto, stop means for limiting the rotation of said shaft in one direction, means yieldingly resisting movement of said shaft under the torque of said motor, and a by-pass for current flowing to said fuses controlled by said shaft.

11. A phase failure and phase reversal protector for motors operated by polyphase alternating current comprising sensitive fuses for opening the circuit, an induction motor in series with the motor to be protected, said induction motor having a rotatable shaft, means limiting the rotative movement of said shaft, and a by-pass for current flowing to said fuses controlled by said shaft comprising an insulating member on said shaft carrying a contact arranged to engage a fixed contact when said motor operates to rotate its shaft.

12. A phase failure and phase reversal protector for motors operated by polyphase alternating current comprising means in circuit with said motors, including a light fuse for breaking the circuit when the current passes therethrough for a short period, an induction motor, and means controlled by said motor when the current characteristics are normal for short circuiting said fuse.

13. A phase failure and phase reversal protector for motors operated by polyphase alternating current comprising means in circuit with said motors, including light fuses for breaking the circuit when the current passes therethrough for a short period, an induction motor connected to said circuit and having a rotatable shaft, and means at least partly mounted on said shaft for short circuiting said fuses when the current characteristics of the circuit are normal.

14. A phase failure and phase reversal protector for motors operated by polyphase alternating current comprising means in circuit with said motors including light fuses for breaking the circuit when the current passes therethrough for a short period, an induction motor having a rotatable shaft and arranged to apply a relatively light torque thereto, stop means for limiting the rotation of said shaft in one direction, means for restoring said shaft to normal position and for opposing the torque of said motor, and a by-pass for current flowing to said fuses comprising an insulating member on said shaft, contacts on said member, and fixed contacts adjacent thereto, said contacts being brought into engagement on rotation of said shaft to its stop position.

Signed by me at Cleveland, Ohio, this 3rd day of June 1926.

CLARENCE J. DRESSER.